United States Patent
Zielinski et al.

(10) Patent No.: US 8,548,132 B1
(45) Date of Patent: Oct. 1, 2013

(54) LAWFUL INTERCEPT TRIGGER SUPPORT WITHIN SERVICE PROVIDER NETWORKS

(75) Inventors: Margaret Zielinski, Hollis, NH (US); Paul Raison, Windham, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 809 days.

(21) Appl. No.: 12/695,845

(22) Filed: Jan. 28, 2010

Related U.S. Application Data

(63) Continuation of application No. 11/414,974, filed on May 1, 2006, now Pat. No. 7,657,011.

(60) Provisional application No. 60/783,131, filed on Mar. 16, 2006.

(51) Int. Cl.
*H04M 11/00* (2006.01)

(52) U.S. Cl.
USPC ........................... 379/93.02; 379/35

(58) Field of Classification Search
USPC ........................ 379/93.02, 90.01, 35; 370/352
See application file for complete search history.

(56) References Cited

U.S. PATENT DOCUMENTS

| | | | |
|---|---|---|---|
| 6,041,042 A | 3/2000 | Bussiere | |
| 6,101,549 A | 8/2000 | Baugher et al. | |
| 6,480,892 B1 | 11/2002 | Levay et al. | |
| 7,046,663 B1 | 5/2006 | Temoshenko et al. | |
| 7,092,493 B2 | 8/2006 | Hou et al. | |
| 7,228,414 B2 | 6/2007 | Smith et al. | |
| 7,228,415 B2 | 6/2007 | Eschbach et al. | |
| 7,242,681 B1 | 7/2007 | Van Bokkelen et al. | |
| 7,283,521 B1 | 10/2007 | Ryan | |
| 7,447,909 B2 | 11/2008 | Reith | |
| 7,461,152 B2 | 12/2008 | Bird et al. | |
| 7,730,521 B1* | 6/2010 | Thesayi et al. | 726/4 |
| 2002/0046273 A1 | 4/2002 | Lahr et al. | |
| 2002/0065938 A1 | 5/2002 | Jungck et al. | |
| 2002/0150096 A1 | 10/2002 | Sjoblom | |
| 2003/0179747 A1 | 9/2003 | Pyke et al. | |
| 2004/0095894 A1 | 5/2004 | Eloranta et al. | |
| 2004/0157629 A1 | 8/2004 | Kallio et al. | |
| 2004/0158710 A1 | 8/2004 | Buer et al. | |
| 2004/0199670 A1 | 10/2004 | Garfinkel | |

(Continued)

OTHER PUBLICATIONS

Chiba et al., "Dynamic Authorization Extensions to Remote Authentication Dial in User Service (RADIUS)," 27 pp., Jul. 2003.

(Continued)

*Primary Examiner* — Stella Woo
(74) *Attorney, Agent, or Firm* — Shumaker & Sieffert, P.A.

(57) ABSTRACT

The invention is directed to techniques for initiating lawful intercept of packets associated with subscriber sessions on a network device of a service provider network based on identification triggers. A law enforcement agency may send an intercept request for a subscriber to an administration device of the service provider network. The administration device may then configure one or more identification triggers for the subscriber based on the intercept request. The techniques described herein initiate lawful intercept when one or more subscriber sessions on a network device match the one or more identification triggers. The techniques described herein include configuring trigger rules that include identification triggers for subscribers on a network device via a command line interface (CLI) of the network device. In addition, the techniques described herein include configuring identification triggers in a subscriber profile on an authentication device connected to a network device.

15 Claims, 7 Drawing Sheets

(56) References Cited

U.S. PATENT DOCUMENTS

| | | |
|---|---|---|
| 2004/0255126 A1 | 12/2004 | Reith |
| 2005/0025061 A1 | 2/2005 | Pedersen et al. |
| 2005/0053073 A1 | 3/2005 | Kloth et al. |
| 2005/0083955 A1 | 4/2005 | Guichard et al. |
| 2005/0174937 A1 | 8/2005 | Scoggins et al. |
| 2006/0059163 A1 | 3/2006 | Frattura et al. |
| 2007/0094397 A1 | 4/2007 | Krelbaum et al. |

OTHER PUBLICATIONS

Baker et al., "Cisco Architecture for Lawful Intercept in IP Networks," 15 pp., Oct. 2003.

U.S. Appl. No. 10/947,729, entitled "Authentication Device Initiated Lawful Intercept of Network Traffic," filed Sep. 23, 2004.

Office Action from U.S. Appl. No. 10/947,729, dated Jun. 6, 2008, 10 pp.

Response to Office Action dated Jun. 6, 2008, from U.S. Appl. No. 10/947,729, filed Sep. 8, 2008, 17 pp.

Office Action from U.S. Appl. No. 10/947,729, dated Dec. 26, 2008, 14 pp.

Response to Office Action dated Dec. 26, 2008, from U.S. Appl. No. 10/947,729, filed Mar. 18, 2009, 19 pp.

Office Action from U.S. Appl. No. 10/947,729, dated Jul. 9, 2009, 7 pp.

Response to Office Action dated Jul. 9, 2009, from U.S. Appl. No. 10/947,729, filed Sep. 28, 2009, 19 pp.

Notice of Allowance from U.S. Appl. No. 10/947,729, dated Jan. 21, 2010, 6 pp.

U.S. Appl. No. 10/948,072, entitled "Packet Structure for Mirrored Traffic Flow," filed Sep. 23, 2004.

Office Action from U.S. Appl. No. 10/948,072, dated Oct. 1, 2008, 14 pp.

Response to Office Action dated Oct. 1, 2008, from U.S. Appl. No. 10/948,072, filed Dec. 31, 2008, 19 pp.

Restriction Requirement from U.S. Appl. No. 10/948,072, dated Apr. 17, 2009, 6 pp.

Response to Restriction Requirement dated Apr. 17, 2009, from U.S. Appl. No. 10/948,072, filed May 4, 2009, 2 pp.

Office Action from U.S. Appl. No. 10/948,072, dated Jul. 15, 2009, 16 pp.

Response to Office Action dated Jul. 15, 2009, from U.S. Appl. No. 10/948,072, filed Oct. 13, 2009, 23 pp.

Office Action from U.S. Appl. No. 10/948,072, dated Jan. 7, 2010, 17 pp.

Response to Office Action dated Jan. 7, 2010, from U.S. Appl. No. 10/948,072, filed Apr. 7, 2010, 28 pp.

* cited by examiner

LAWFUL INTERCEPT TRIGGER SUPPORT WITHIN SERVICE PROVIDER NETWORKS

This application is a continuation of U.S. application Ser. No. 11/414,974, filed May 1, 2006, which claims the benefit of U.S. Provisional Application Ser. No. 60/783,131, filed Mar. 16, 2006, the entire contents of which are incorporated herein by reference.

TECHNICAL FIELD

The invention relates to computer networks and, more particularly, to lawful intercept of traffic within service provider networks.

BACKGROUND

A computer network is a collection of interconnected computing devices that can exchange data and share resources. In a packet-based network, the computing devices communicate data by dividing the data into small blocks called packets. For example, a service provider network may provide subscriber devices access to other private or public networks, such as the Internet. Certain devices within the service provider network, such as routers, maintain routing information that describes routes through the service provider network. In this way, the packets may be individually routed across the service provider network from a source device to a destination device. The destination device extracts the data from the packets and assembles the data into its original form.

A system administrator may make use of an analyzer device within the service provider network to monitor network traffic. In general, an analyzer device is a tool that captures data from a network and presents the data to a user. The analyzer device typically allows an authorized user to browse the captured data and view summary and detail information for each packet. Accordingly, the authorized user can view the network traffic flowing between devices on the service provider network. For example, the authorized user of the network analyzer may be a Law Enforcement Agency (LEA).

In some cases, a LEA may require the system administrator to mirror network traffic flowing to and from one or more designated subscriber devices. The original network traffic is routed across the service provider network as usual while a mirrored version of the network traffic is forwarded for analysis. The term "lawful intercept" is used to describe the process by which LEAs conduct electronic surveillance of packet-based communications as authorized by a judicial or administrative order. Increasingly, legislation and regulations are being adopted that require public and private service providers to support authorized electronic surveillance. This increase is due in part to the increased use of computer networks for real-time voice communications using, for example, Voice over IP (VoIP).

In some cases, lawful intercept of network traffic may be enabled on a specific interface of a network device within the service provider network via a command line interface (CLI). However, this technique may become difficult as the amount of network traffic and network devices increases. Moreover, activating lawful intercept on a specific interface of the network device may not work well in environments where subscribers login and logout frequently. In other cases, an authentication device, such as a Remote Authentication Dial-In User Service (RADIUS) device, connected to a network device within a service provider network may enable lawful intercept of network traffic for a specific subscriber to the network device. However, some service providers do not use external authentication devices to authenticate their subscriber logins. Furthermore, some service providers may not have access to the authentication device connected to the network device.

SUMMARY

In general, the invention is directed to techniques for initiating lawful intercept of packets associated with subscriber sessions on a network device of a service provider network based on identification triggers. A law enforcement agency may send an intercept request for a subscriber to an administration device of the service provider network. The administration device may then configure one or more identification triggers for the subscriber based on the intercept request. The techniques described herein initiate lawful intercept when one or more subscriber sessions on a network device match the one or more identification triggers.

The identification triggers may include an account session ID, a calling station ID, a client Internet Protocol (IP) address and virtual router, a user name and virtual router, and a network access server (NAS) port ID. In general, a single physical router may be represented as a plurality of virtual routers that each define an IP address space such that the virtual routers may have the same IP address but be individually identified. The addition of a virtual router to a client IP address or a user name creates a sufficiently specific identification trigger. Each of the identification triggers listed has a precedence level where the highest precedence is given to the most specific identification trigger. When a subscriber session matches more than one identification trigger, the techniques select one of the identification triggers with the highest precedence level to identify the subscriber to which lawful interception is applied.

The techniques described herein include configuring trigger rules that include identification triggers for subscribers on a network device via a command line interface (CLI) of the network device. Upon receiving the trigger rules, the network device may compare active subscriber sessions and subsequent subscriber logins on the network device to the trigger rules and intercept packets associated with the subscriber sessions that match the trigger rules. In this way, a network device within a service provider network may initiate lawful intercept for one or more subscriber sessions without using an external authentication device, such as a Remote Authentication Dial-In User Service (RADIUS) device.

In addition, the techniques described herein include configuring two or more identification triggers in a subscriber profile on an authentication device connected to a network device. If the subscriber is not logged in, the authentication device may receive a subscriber login from the network device, authenticate the subscriber login, and send an authentication response for the subscriber that includes an intercept message to the network device. If the subscriber is already logged in, the authentication device may send an intercept message for the subscriber during active subscriber sessions of the subscriber on the network device. In either case, the intercept message includes the two or more identification triggers included in the subscriber profile. The network device may intercept packets associated with subscriber sessions that match the two or more identification triggers included in the intercept message. In this way, the techniques may initiate intercept on a network device for a subscriber identified by multiple identifiers.

In some cases, a network device may receive mirroring configurations for a subscriber from both a CLI of the network device and an authentication device connected to the network device. The network device then applies one of the mirroring configurations to a subscriber session based on whether the mirroring configurations are received at or after establishment of the subscriber session.

In one embodiment, a method comprises receiving an intercept request for a subscriber with an administration device and configuring a trigger rule for the subscriber on a network device via a CLI of the network device based on the intercept request. The method also comprises intercepting packets associated with one or more subscriber sessions on the network device when one or more subscriber sessions match the trigger rule.

In another embodiment, a system comprises an administration device that receives an intercept request for a subscriber, and a network device that includes a CLI through which the administration device configures a trigger rule for the subscriber on the network device based on the intercept request. The network device also includes an intercept module that intercepts packets associated with one or more subscriber sessions on the network device when one or more subscriber sessions match the trigger rule.

In another embodiment, a method comprises receiving an intercept request for a subscriber with an administration device and configuring two or more identification triggers for the subscriber within a subscriber profile on an authentication device, wherein each of the two or more identification triggers has a precedence level. The method further comprises sending an intercept message for the subscriber that includes the two or more identification triggers to a network device connected to the authentication device. The method also includes selecting one of the two or more identification triggers with the highest precedence level with the network device, and intercepting packets associated with one or more subscriber sessions on the network device when the one or more subscriber sessions match the selected one of the identification triggers.

In a further embodiment, a system comprises an administration device that receives an intercept request for a subscriber, and an authentication device that includes a subscriber profile within which the administration device configures two or more identification triggers for the subscriber, wherein each of the two or more identification triggers has a precedence level. The authentication device also includes a network device module that sends an intercept message for the subscriber that includes the two or more identification triggers to a network device connected to the authentication device. The system further compromises a network device that selects one of the two or more identification triggers with the highest precedence level, and intercepts packets associated with one or more subscriber sessions on the network device when the one or more subscriber sessions match the selected one of the identification triggers.

In another embodiment, a method comprises receiving a first mirroring configuration for a subscriber from a CLI of a network device and receiving a second mirroring configuration for the subscriber from an authentication device connected to the network device. The method further comprises applying one of the first and second mirroring configurations to a subscriber session on the network device based on when the first and second mirroring configurations are received.

In a further embodiment, a network device comprises a CLI that receives a first mirroring configuration for a subscriber and an authentication module that receives a second mirroring configuration for the subscriber from an authentication device connected to the network device. The network device also comprises an intercept module that applies one of the first and second mirroring configurations to a subscriber session on the network device based on when the first and second mirroring configurations are received.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
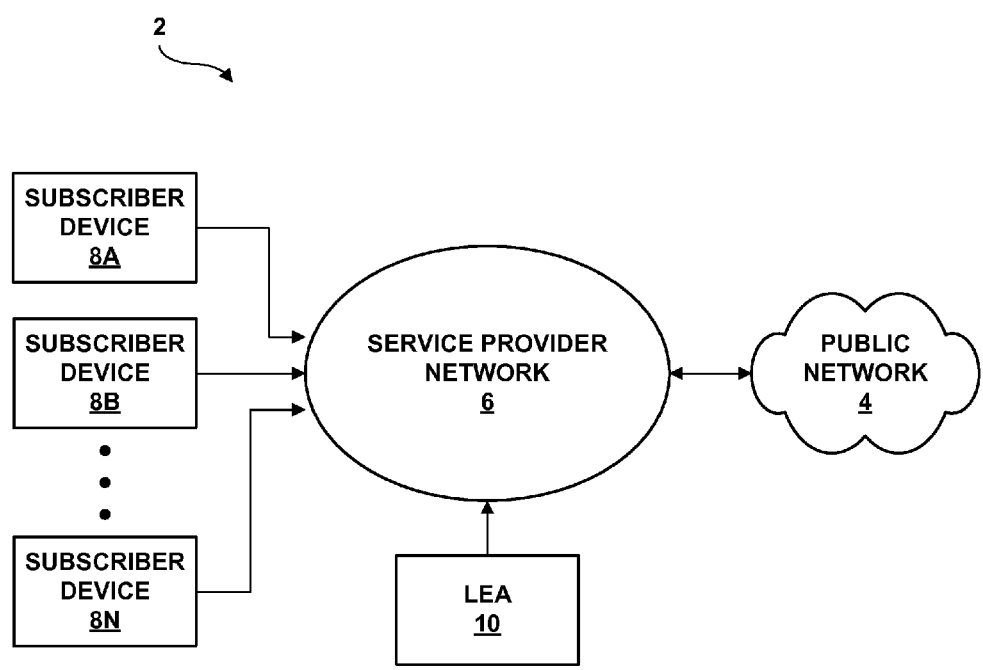
FIG. 1 illustrates an exemplary network system in which a service provider network enables lawful intercept of packets associated with one or more subscriber sessions for a requested one of subscriber devices.

FIG. 1 illustrates an exemplary network system 2 in which a service provider network 6 enables lawful intercept of packets associated with one or more subscriber sessions for a requested one of subscriber devices 8A-8N ("subscriber devices 8"). A law enforcement agency (LEA) 10 may send an intercept request to service provider network 6 that designates one of subscriber devices 8 for network traffic monitoring and includes identification information related to the requested subscriber. Typically, a legal court order, such as a warrant, must be granted to LEA 10 prior to requesting service provider network 6 to enable lawful intercept on subscriber sessions for a specific one of subscriber devices 8.

Service provider network 6 enables subscriber devices 8 to access public network 4. Public network 4 may comprise the Internet, or any other public network. Subscriber devices 8 may be connected to service provider network 6 via broadband links, such as those associated with a cable or digital subscriber line (DSL) service.

In accordance with the principles of the invention, the lawful intercept is initiated for packets associated with subscriber sessions on service provider network 6 based on identification triggers for a requested one of subscriber devices 8. An administration device (not shown in FIG. 1) within service provider network 6 may configure one or more identification triggers for the requested one of subscriber devices 8 based on an intercept request received from LEA 10. Techniques described herein initiate lawful intercept within service provider network 6 when one or more subscriber sessions for the requested one of subscriber devices 8 match the one or more identification triggers.

The identification triggers may include an account session ID, a calling station ID, a client Internet Protocol (IP) address and virtual router, a user name and virtual router, and a network access server (NAS) port ID. In general, a single physical router may be represented as a plurality of virtual routers that each define an IP address space such that the virtual routers may have the same IP address but be individually identified. The addition of a virtual router to a client IP address or a user name creates a sufficiently specific identification trigger. Each of the identification triggers has a precedence level where the highest precedence is given to the most specific identification trigger. The list of identification triggers given above is in order from highest precedence level to lowest precedence level.

For example, the techniques described herein include configuring trigger rules that include identification triggers for the requested one of subscriber devices 8 via a command line interface (CLI) of a network device within service provider network 6. In this way, a network device within a service provider network may initiate lawful intercept for one or more subscriber sessions without using an external authentication device, such as a Remote Authentication Dial-In User Service (RADIUS) device. In addition, the techniques described herein include configuring identification triggers in a profile for the requested one of subscriber devices 8 on an authentication device connected to a network device within service provider network 6. In this way, an authentication device connected to a network device within a service provider network may initiate lawful intercept on the network device for one or more subscriber sessions.

Once lawful intercept is enabled on one or more subscriber sessions for a requested one of subscriber devices 8, service provider network 6 allows mirroring of packets flowing to and from the requested one of subscriber devices 8. The mirrored packets are forwarded to an analyzer device, which may reside within or be remote to service provider network 6. The analyzer device then performs analysis of the mirrored packets and provides packet analysis information to LEA 10.

In the illustrated embodiment of FIG. 1, it is assumed for purposes of illustration that the analyzer device is located within service provider network 6. In other embodiments, the analyzer device may be remotely located, e.g., within a different service provider network. In that case, the mirrored packets may be encapsulated in a unique packet structure that enables routing and analysis of mirrored packets of any network type.

The term "packet" is used herein to generally describe a unit of data communicated between resources in conformance with a communication protocol. The principles of the invention may be readily applied to a variety of protocols, such as the Transmission Control Protocol (TCP), the User Datagram Protocol (UDP), the Internet Protocol (IP), Asynchronous Transfer Mode (ATM), Frame Relay, and the like. Accordingly, "packet" is used to encompass any such unit of data, and may be interchanged with the term "cell," or other similar terms used in such protocols to describe a unit of data communicated between resources within the network.

Figure 2:
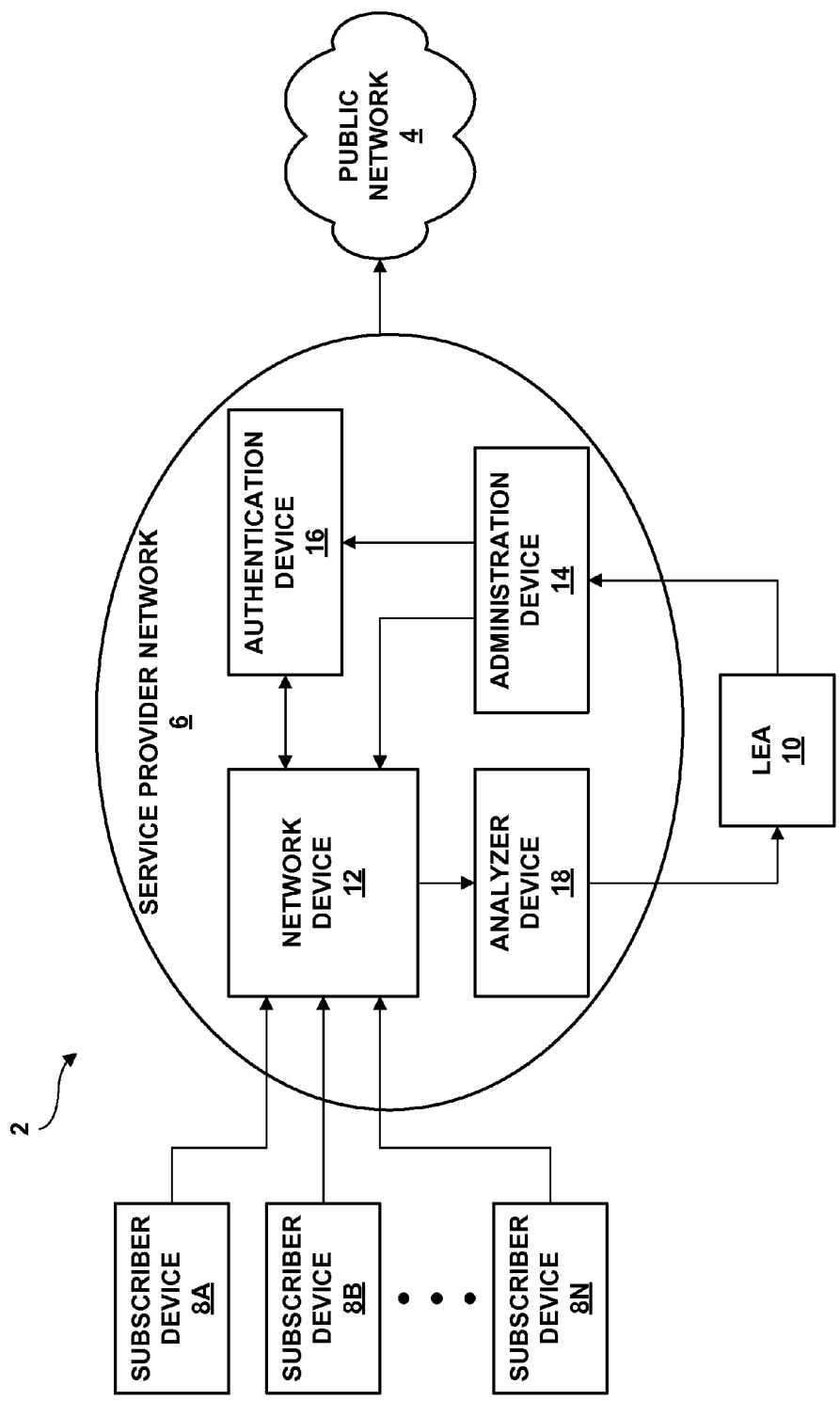
FIG. 2 is a block diagram illustrating an exemplary embodiment of the network system from FIG. 1 in greater detail.

FIG. 2 is a block diagram illustrating an exemplary embodiment of network system 2 from FIG. 1 in greater detail. In the embodiment shown in FIG. 2, service provider network 6 includes a network device 12, an administration device 14, an authentication device 16, and an analyzer device 18. Network device 12 may comprise a router or another device capable of performing packet mirroring. Authentication device 16 may comprise a Remote Access Dial-In User Service (RADIUS) device. In some embodiments, analyzer device 18 may be referred to as a mediation device. Furthermore, administration device 14, authentication device 16, and analyzer device 18 may be located, in whole or in part, in other service provider networks.

Network device 12 receives subscriber logins from one or more of subscriber devices 8. A subscriber login may include a username and password for one of subscriber devices 8. Network device 12 then authenticates the received subscriber logins to provide subscriber devices 8 access to service provider network 6 and, therefore, public network 4. In some embodiments, network device 12 may internally authenticate the subscriber logins. In other embodiments, network device 12 may send the received subscribers logins to authentication device 16 for authentication. Authentication device 16 may store profiles for subscriber devices 8 that include information to be applied to subscriber sessions on network device 12 for subscriber devices 8. For example, subscriber profiles within authentication device 16 may include defined bandwidth allocations, latency values, and error rates. Authentication device 16 authenticates the subscriber logins and sends network device 12 authentication responses.

LEA 10 sends an intercept request to administration device 14 that specifies one of subscriber devices 8 on which to perform lawful intercept. The intercept request may include identification information for the one of subscriber devices 8 as well as other information, such as duration of intercept and type of intercept. Administration device 14 configures one or more identification triggers for the requested one of subscriber devices 8 based on the information included in the intercept request received from LEA 10. Lawful intercept may be initiated on network device 12 when one or more subscriber sessions for the requested one of subscriber devices 8 match the one or more identification triggers.

In one embodiment, administration device 14 configures trigger rules that include identification triggers for the requested one of subscriber devices 8 via a CLI of network device 12 within service provider network 6. The trigger rules may be persistently stored on network device 12. In this way, the trigger rules may be maintained on network device 12 even when network device 12 reboots. Network device 12 may support approximately 100 persistent trigger rules. The persistently stored trigger rules are explicitly removed from network device 12 via the CLI of network device 12. The trigger rules also specify a mirroring policy stored within network device 12 that specifies analyzer device 18.

Upon receiving the trigger rules, network device 12 may compare active subscriber sessions and subsequent subscriber logins on network device 12 to the trigger rules. Network device 12 then applies the mirroring policy to one or more subscriber sessions that match one of the trigger rules and intercepts packets associated with the subscriber sessions. When a subscriber session matches more than one of the configured trigger rules, network device 12 selects the one of the trigger rules that includes the identification trigger with the highest precedence level to identify the requested one of subscriber devices 8 to which lawful intercept is applied.

In another embodiment, administration device 14 configures two or more identification triggers in a profile for the requested one of subscriber devices 8 on authentication device 16 within service provider network 6. If the one of subscriber device 8 is not logged in, authentication device 16 may receive a subscriber login from network device 12, authenticate the subscriber login, and send an authentication response for the one of subscriber devices 8 that includes an intercept message to network device 12. If the one of subscriber devices 8 is already logged in, authentication device 16 may send an intercept message for the one of subscriber device 8 during active subscriber sessions of the subscriber on network device 12. In either case, the intercept message includes the two or more identification triggers included in the subscriber profile on authentication device 16.

Network device 12 assigns a mirroring policy stored within network device 12 that specifies analyzer device 18 to each of the two or more identification triggers included in the intercept message. Network device 12 then selects one of the two or more identification triggers with the highest precedence level. Network device 12 applies the specified mirroring policy to one or more subscriber sessions that match the selected one of the identification triggers and intercepts packets associated with the subscriber sessions.

In either embodiment, network device 12 mirrors packets associated with identified subscriber sessions for a requested one of subscriber devices 8. Network device 12 mirrors packets until the requested one of subscriber devices 8 logs off of network device 12 or the lawful intercept is deactivated. Network device 12 forwards the original packets as usual and forwards the mirrored packets to analyzer device 18 as specified by the associated mirroring policy. Analyzer device 18 receives the mirrored packets from network device 12 and performs analysis of the mirrored packets. Analyzer device 18 then provides packet analysis information to LEA 10. In some cases, analyzer device 18 translates the packet analysis information into a format required by the local jurisdiction (e.g., country or state) of LEA 10 prior to providing the information to LEA 10.

In some cases, network device 12 may receive mirroring configurations for a subscriber from both a CLI of network device 12 and authentication device 16 connected to network device 12. For example, one of the mirroring configurations may include a trigger rule from the CLI of network device 12 that matches the subscriber session, and the other one of the mirroring configurations may include an intercept message for the subscriber from authentication device 16 that includes an identification trigger that matches the subscriber session. Network device 12 then applies one of the mirroring configurations to a subscriber session based on whether the mirroring configurations are received at or after establishment of the subscriber session.

Figure 3:
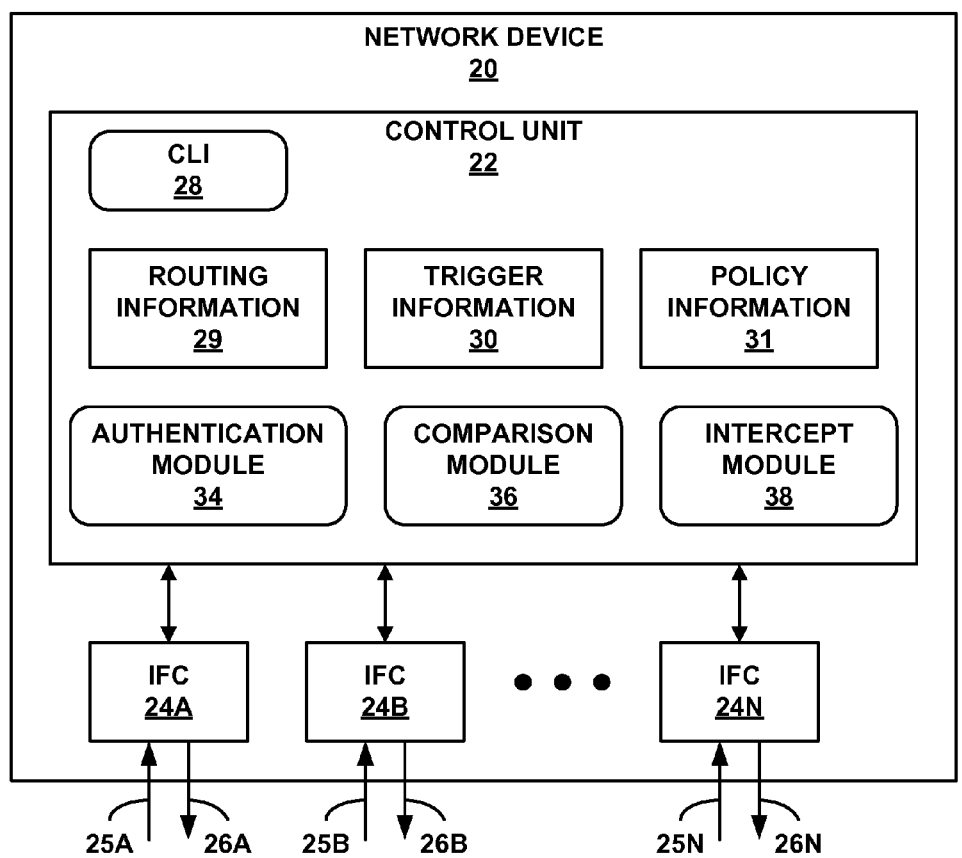
FIG. 3 is a block diagram illustrating a network device capable of performing packet mirroring in accordance with embodiments of the invention.

FIG. 3 is a block diagram illustrating a network device 20 capable of performing packet mirroring in accordance with embodiments of the invention. Network device 20 may operate substantially similar to network device 12 within service provider network 6 from FIG. 2. In the illustrated embodiment, network device 20 comprises a router. Network device 20 includes interface cards (IFCs) 24A-24N ("IFCs 24") that receive packets on incoming links 25A-25N ("incoming links 25") and send packets on outgoing links 26A-26N ("outgoing links 26").

Network device 20 also includes a control unit 22 that includes a command line interface (CLI) 28, routing information 29, trigger information 30, policy information 31, an authentication module 34, comparison module 36, and an intercept module 38. Routing information 29 maintains a network topology for a network that includes network device 20. CLI 28 receives commands from an administration device connected to network device 20. For example, CLI 28 may receive commands from the administration device based on an intercept request for a subscriber on which a LEA requests lawful intercept.

CLI 28 receives a first CLI command from the administration device that configures a mirroring policy for the requested subscriber on network device 20. Policy information 31 within network device 20 stores the mirroring policy. The mirroring policy specifies an analyzer device connected to network device 20 to receive mirrored packets from network device 20. The configured mirroring policy identifies the requested subscriber as either a tunneled subscriber or a terminated subscriber. For a tunneled subscriber, the administration device configures a Layer Two Tunneling Protocol (L2TP) mirroring policy. For a terminated user, the administration device configures an Internet Protocol (IP) mirroring policy. However, the administration device may not know whether the requested subscriber is a tunneled subscriber or a terminated subscriber. In this case, the administration device may configure two mirroring policies for the requested subscriber, one for a L2TP subscriber and another one for an IP subscriber.

CLI 28 then receives a second CLI command from the administration device that configures a trigger rule for the requested subscriber on network device 20. The second CLI command configures an identification trigger and specifies the mirroring policy stored within policy information 31. Multiple trigger rules may specify the same mirroring policy. Trigger information 30 within network device 20 persistently stores the trigger rule. In this way, the trigger rule may be maintained within trigger information 30 through a reboot of network device 20. In order to remove the persistently stored trigger rule, CLI 28 receives an explicit CLI command from the administration device. For example, CLI 28 may receive a third CLI command that is a "no" version of the second CLI command. Network device 12 may simultaneously support approximately 100 persistent trigger rules.

The identification trigger included within the trigger rule configured via CLI 28 may include one of an account session ID, a calling station ID, a client IP address and virtual router, a user name and virtual router, and a NAS port ID. Each of the identification triggers has a precedence level where the highest precedence is given to the most specific identification trigger. The list of identification triggers given above is in order from highest precedence level to lowest precedence level.

Comparison module 36 within network device 20 compares currently active subscriber sessions on network device 20 with the trigger rule stored in trigger information 30. Comparison module 36 also compares subsequent subscriber logins to network device 20 with the trigger rule within trigger information 30. Intercept module 38 applies the mirroring policy specified by the trigger rule to the identified subscriber sessions when comparison module 36 finds a match between the one or more subscriber sessions and the trigger rule.

In some cases, CLI 28 may receive two or more trigger rules for the requested subscriber that include different identification triggers. If comparison module 36 finds a match between the one or more subscriber sessions and more than one of the trigger rules, comparison module 36 selects one of the two or more trigger rules that includes the identification trigger with the highest precedence level. Intercept module 38 then applies the mirroring policy specified by the selected one of the two or more trigger rules to the identified subscriber sessions.

Intercept module 38 then mirrors packets associated with the identified subscriber sessions in accordance with the mirroring policy. Network device 20 forwards the mirrored packets to an analyzer device specified in the mirroring policy applied to the identified subscriber sessions. The analyzer device then performs analysis of the mirrored packets and provides the packet analysis information to the LEA that requested intercept of the subscriber. In addition, network device 20 forwards the original packets associated with the one or more subscriber sessions in accordance with routing information 29 included in network device 20.

Intercept module 38 may intercept and mirror packets associated with one or more subscriber sessions for the requested subscriber in a variety of ways. For example, intercept module 38 may buffer incoming packets associated with the requested subscriber, and digitally copy each buffered packet to internally mirror the packets. Alternatively, intercept module 38 may simply forward a duplicate of each intercepted packet to the analyzer device specified by the mirroring policy applied to the one or more subscriber sessions without digitally copying the intercepted packet.

The architecture of network device 20 illustrated in FIG. 3 is shown for exemplary purposes only. Practice of the principles of the invention is not limited to this architecture. In other embodiments, network device 20 may be configured in a variety of ways. In one embodiment, for example, control unit 22 and its corresponding functionality may be distributed within IFCs 24. In another embodiment, control unit 22 may include a routing engine that performs route resolution and maintains routing information 29, and a forwarding engine that performs packet forwarding based on forwarding information.

Control unit 22 may be implemented solely in software, or hardware, or may be implemented as a combination of software, hardware, or firmware. For example, control unit 22 may include one or more processors which execute software instructions. In that case, the various software modules of control unit 22, such as authentication module 34 and intercept module 38, may comprise executable instructions stored on a computer-readable medium, such as computer memory or hard disk.

As described above, network device 20 may receive a first mirroring configuration that includes a trigger rule from CLI 28 that matches a subscriber session for the requested subscriber. In some cases, network device 20 may also receive a second mirroring configuration that includes an intercept message from an authentication device connected to network device 20 that includes an identification trigger that matches a subscriber session for the requested subscriber. Intercept module 38 may then determine which of the first and second mirroring configurations to apply to the subscriber session based on whether the mirroring configurations are received at or after establishment of the subscriber session. When both of the first and second mirroring configurations are received at establishment of the subscriber session, intercept module 38 applies the second mirroring configuration from the authentication device to the subscriber session on network device 20. When at least one of the first and second mirroring configurations is received after establishment of the subscriber session, intercept module 38 applies the more recently received one of the first and second mirroring configurations to the subscriber session on network device 20.

Figure 4:
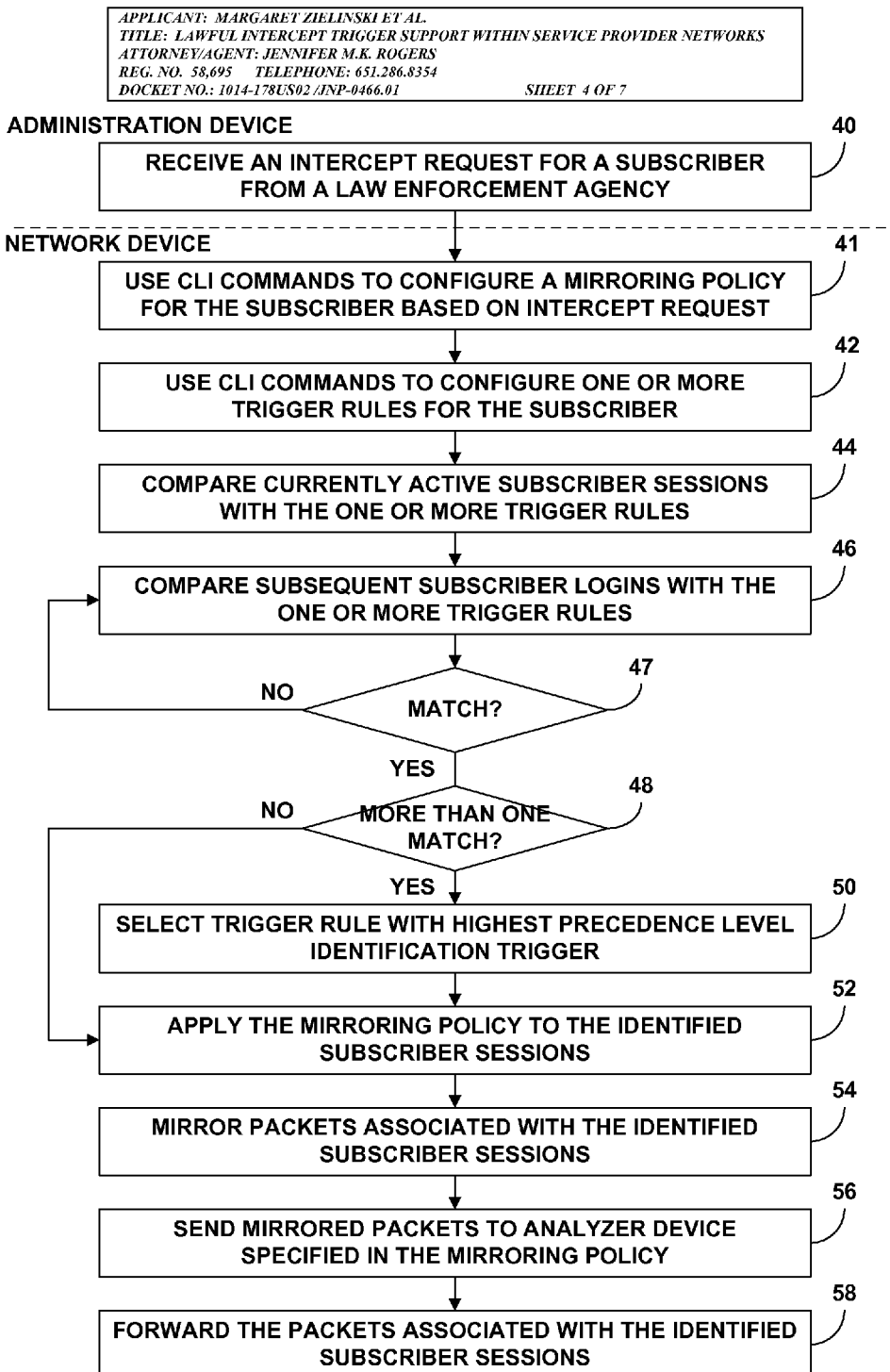
FIG. 4 is a flowchart illustrating an exemplary operation of initiating lawful intercept via a CLI of a network device, such as a router.

FIG. 4 is a flowchart illustrating an exemplary operation of initiating lawful intercept via a CLI of a network device, such as a router. The operation will be described herein in reference to network device 20 from FIG. 3. An administration device connected to network device 20 receives an intercept request for a specific subscriber from a LEA (40). The administration device then uses CLI commands to configure a mirroring policy for the requested subscriber on network device 20 via CLI 28 of network device 20 (41). Network device 20 stores the mirroring policy within policy information 31.

The administration device then uses CLI commands to configure one or more trigger rules for the requested subscriber on network device 20 via CLI 28 of network device 20 (42). Each of the one or more trigger rules includes an identification trigger and specifies the mirroring policy stored within policy information 31. Each of the trigger rules has a precedence level where the highest precedence is given to the trigger rule that includes the most specific identification trigger. Network device 20 persistently stores the one or more trigger rules within trigger information 30.

Comparison module 36 within network device 20 compares currently active subscriber sessions on network device 20 with the one or more trigger rules stored in trigger information 30 (44). Comparison module 36 also compares subsequent subscriber logins to network device 20 with the one or more trigger rules within trigger information 30 (46). If no match is found (no branch of 47), comparison module 36 continues to compare subsequent subscriber logins to network device 20 with the one or more trigger rules (46). When one or more of the subscriber sessions match one of the trigger rules (yes branch of 47), comparison module 36 then determines whether the identified subscriber sessions match two or more of the trigger rules (48).

If the one or more subscriber sessions match two or more of the trigger rules, comparison module 36 selects one of the two or more trigger rules that includes the identification trigger with the highest precedence level (50). Intercept module 38 applies the mirroring policy specified by the one matching trigger rule or the selected one of the two or more matching trigger rules to the identified subscriber sessions (52). Intercept module 38 then mirrors packets associated with the identified subscriber sessions in accordance with the mirroring policy (54).

Network device 20 forwards the mirrored packets to an analyzer device specified in the mirroring policy applied to the identified subscriber sessions (56). The analyzer device then performs analysis of the mirrored packets and provides the packet analysis information to the LEA that requested intercept of the subscriber. In addition, network device 20 forwards the original packets associated with the one or more subscriber sessions in accordance with routing information 29 included in network device 20 (58).

Figure 5:
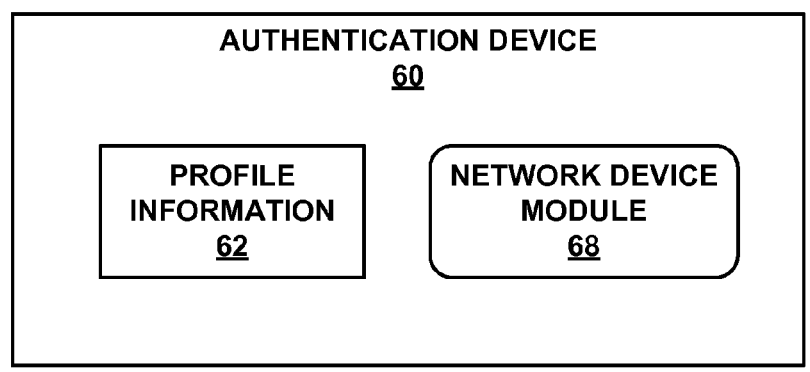
FIG. 5 is a block diagram illustrating an exemplary embodiment of an authentication device capable of initiating lawful intercept on a network device in accordance with an embodiment of the invention.

FIG. 5 is a block diagram illustrating an exemplary embodiment of an authentication device 60 capable of initiating lawful intercept on a network device in accordance with an embodiment of the invention. Authentication device 60 may operate substantially similar to authentication device 16 within service provider network 6 from FIG. 1. In the illustrated embodiment, authentication device 60 comprises profile information 62 and network device module 68. In some embodiments, authentication device 60 may comprise a RADIUS device.

Authentication device 60 receives updates to profile information 62 from an administration device connected to network device 20. For example, authentication device 60 may receive updates to profile information 62 from the administration device based on an intercept request for a subscriber on which a LEA requests lawful intercept. Authentication device 60 receives updates to a subscriber profile from the administration device that configures two or more identification triggers for the requested subscriber.

The identification triggers stored in profile information 62 may include two or more of an account session ID, a calling station ID, a client IP address and virtual router, a user name and virtual router, and a NAS port ID. Each of the identification triggers has a precedence level where the highest precedence is given to the most specific identification trigger. The list of identification triggers given above is in order from highest precedence level to lowest precedence level.

If the requested subscriber is not logged in, authentication device 60 may receive a subscriber login from a network device connected to authentication device 60 and authenticate the subscriber login. Network device module 68 retrieves the two or more identification triggers stored in profile information 62 for the subscriber and includes the two or more identification triggers in an intercept message for the subscriber. Network device module 68 then sends an authentication response for the subscriber that includes the intercept message to the network device.

If the requested subscriber is already logged in, network device module 68 retrieves the two or more identification triggers stored in profile information 62 for the subscriber and includes the two or more identification triggers in an intercept message for the subscriber. Network device module 68 then sends the intercept message to the network device during active subscriber sessions of the subscriber on the network device.

Upon receiving the intercept message, the network device assigns a mirroring policy stored within the network device that specifies an analyzer device to each of the two or more identification triggers included in the intercept message. The network device then selects one of the two or more identification triggers with the highest precedence level, and applies the specified mirroring policy to one or more subscriber sessions that match the selected one of the identification triggers. The network device mirrors packets associated with the identified subscriber sessions in accordance with the mirroring policy. The network device forwards the mirrored packets to the analyzer device specified in the mirroring policy applied to the identified subscriber sessions. The analyzer device then performs analysis of the mirrored packets and provides the packet analysis information to the LEA that requested intercept of the subscriber. In addition, the network device forwards the original packets associated with the one or more subscriber sessions in accordance with routing information included in the network device.

Figure 6:
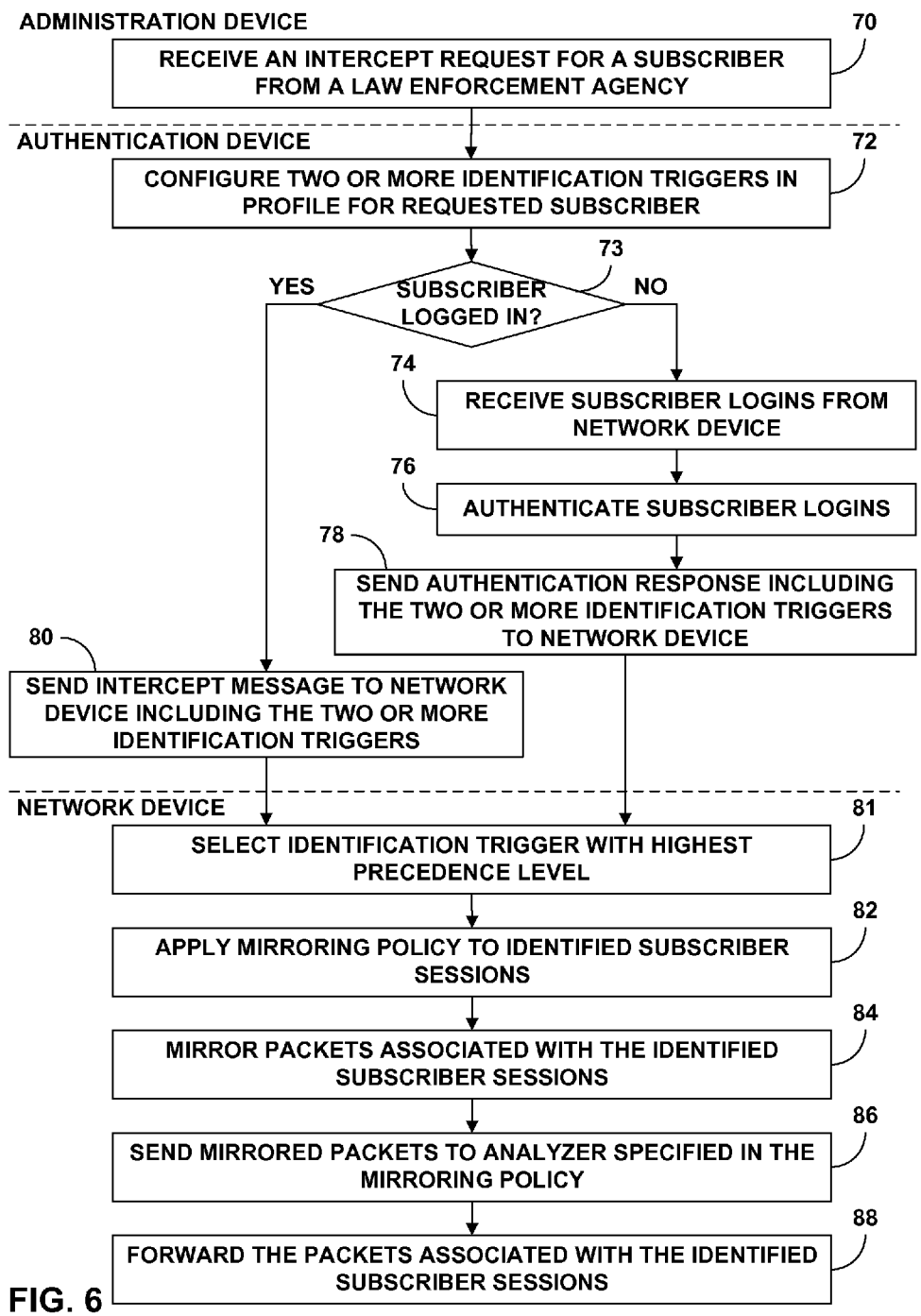
FIG. 6 is a flowchart illustrating an exemplary operation of initiating lawful intercept via an authentication device connected to a network device.

FIG. 6 is a flowchart illustrating an exemplary operation of initiating lawful intercept via an authentication device connected to a network device, such as a router. The operation will be described herein in reference to authentication device 60 from FIG. 5 and network device 20 from FIG. 3. An administration device connected to authentication device 60 receives an intercept request for a specific subscriber from a LEA (70). The administration device then configures two or more identification triggers for the requested subscriber in profile information 62 on authentication device 60 (72). Each of the identification triggers has a precedence level where the highest precedence is given to the most specific identification trigger.

If the requested subscriber is not logged in (no branch of 73), authentication device 60 may receive subscriber logins from network device 20 (74). Authentication device 60 then authenticates the subscriber logins (76). Network device module 68 included in authentication device 60 retrieves the two or more identification triggers stored in profile information 62 for the subscriber and includes the two or more identification triggers in an intercept message for the subscriber. Network device module 68 sends an authentication response for the subscriber including the intercept message to network device 20 (78).

If the requested subscriber is already logged in (yes branch of 73), network device module 68 retrieves the two or more identification triggers stored in profile information 62 for the subscriber and includes the two or more identification triggers in an intercept message for the subscriber. Network device module 68 then sends the intercept message to network device 20 during active subscriber sessions of the subscriber on network device 20 (80).

In either case, upon receiving the intercept message, intercept module 38 within network device 20 assigns a mirroring policy stored within network device 20 that specifies an analyzer device to each of the two or more identification triggers included in the intercept message. Comparison module 36 then selects one of the two or more identification triggers with the highest precedence level (81). Intercept module 38 applies the specified mirroring policy to one or more subscriber sessions that match the selected one of the identification triggers (82). Intercept module 38 then mirrors packets associated with the identified subscriber sessions in accordance with the mirroring policy (84). Network device 20 forwards the mirrored packets to the analyzer device specified in the mirroring policy applied to the identified subscriber sessions (86). The analyzer device then performs analysis of the mirrored packets and provides the packet analysis information to the LEA that requested intercept of the subscriber. In addition, network device 20 forwards the original packets associated with the one or more subscriber sessions in accordance with routing information 29 included in network device 20 (88).

Figure 7:
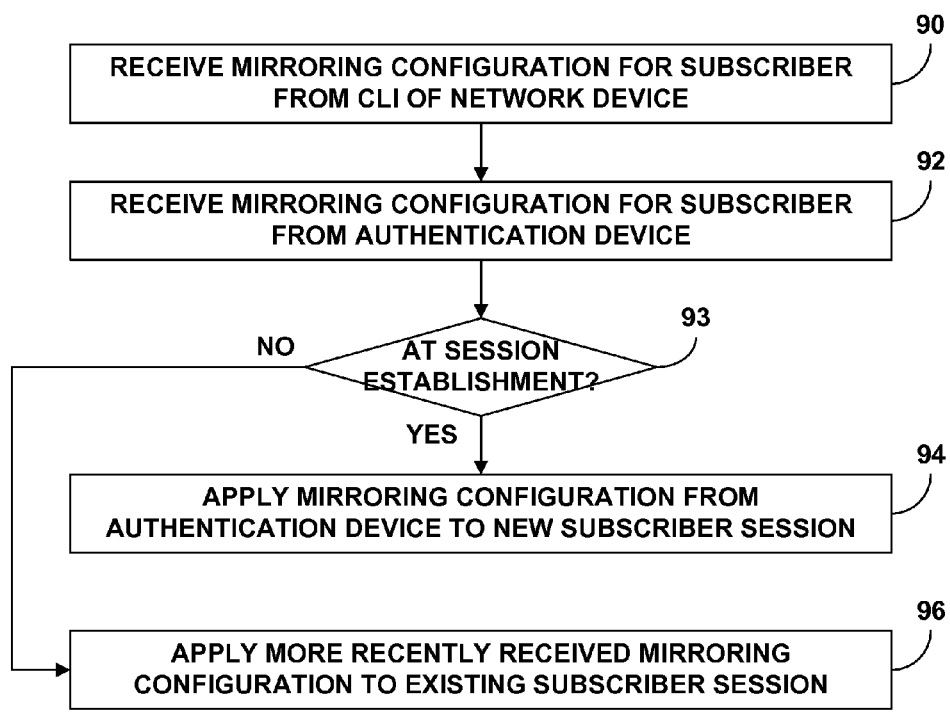
FIG. 7 is a flowchart illustrating an exemplary operation of resolving conflicting mirroring configurations received on a network device.

FIG. 7 is a flowchart illustrating an exemplary operation of resolving conflicting mirroring configurations received on a network device, such as a router. The operation will be described herein in reference to network device 20 from FIG. 3. CLI 28 of network device 20 receives a first mirroring configuration for a subscriber (90). In this case, the first mirroring configuration includes a trigger rule from CLI 28 that matches a subscriber session for the requested subscriber.

Authentication module 34 of network device 20 receives a second mirroring configuration for the same subscriber from an authentication device, such as authentication device 60 from FIG. 5, connected to router 20 (92). In this case, the second mirroring configuration includes an intercept message from the authentication device that includes an identification trigger that matches a subscriber session for the requested subscriber.

Intercept module 38 within network device 20, determines whether the first and second mirroring configurations were received at establishment of the subscriber session (93). When both of the first and second mirroring configurations are received at establishment of the subscriber session, intercept module 38 applies the second mirroring configuration from the authentication device to the subscriber session on network device 20 (94). When at least one of the first and second mirroring configurations is received after establishment of the subscriber session, intercept module 38 applies the more recently received one of the first and second mirroring configurations to the subscriber session on network device 20 (96).

Various embodiments of the invention have been described. These and other embodiments are within the scope of the following claims.

The invention claimed is:
1. A method comprising:
  receiving a first mirroring configuration for a subscriber from a command line interface (CLI) of a network device;
  receiving a second mirroring configuration for the subscriber from an authentication device connected to the network device; and
  applying one of the first and second mirroring configurations to a subscriber session on the network device based on when the first and second mirroring configurations are received.
2. The method of claim 1, further comprising applying the second mirroring configuration from the authentication device to the subscriber session on the network device when both of the first and second mirroring configurations are received at establishment of the subscriber session.

3. The method of claim 1, further comprising applying the more recently received one of the first and second mirroring configurations to the subscriber session when at least one of the first and second mirroring configurations is received after establishment of the subscriber session.

4. The method of claim 1, wherein receiving the first mirroring configuration comprises receiving a trigger rule from the CLI of the network device that matches the subscriber session.

5. The method of claim 1, wherein receiving the second mirroring configuration comprises receiving an intercept message for the subscriber from the authentication device that includes an identification trigger that matches the subscriber session.

6. A network device comprising:
a command line interface (CLI) that receives a first mirroring configuration for a subscriber;
an authentication module that receives a second mirroring configuration for the subscriber from an authentication device connected to the network device; and
an intercept module that applies one of the first and second mirroring configurations to a subscriber session on the network device based on when the first and second mirroring configurations are received.

7. The network device of claim 6, wherein the intercept module applies the second mirroring configuration from the authentication device to the subscriber session on the network device when both of the first and second mirroring configurations are received at establishment of the subscriber session.

8. The network device of claim 6, wherein the intercept module applies the more recently received one of the first and second mirroring configurations to the subscriber session when at least one of the first and second mirroring configurations is received after establishment of the subscriber session.

9. The network device of claim 6, wherein the first mirroring configuration comprises a trigger rule from the CLI of the network device that matches the subscriber session.

10. The network device of claim 6, wherein the second mirroring configuration comprises an intercept message for the subscriber from the authentication device that includes an identification trigger that matches the subscriber session.

11. A non-transitory computer-readable medium comprising instructions causing a processor to:
receive a first mirroring configuration for a subscriber from a command line interface (CLI) of a network device;
receive a second mirroring configuration for the subscriber from an authentication device connected to the network device; and
apply one of the first and second mirroring configurations to a subscriber session on the network device based on when the first and second mirroring configurations are received.

12. The non-transitory computer-readable medium of claim 11, further comprising instructions causing the processor to apply the second mirroring configuration from the authentication device to the subscriber session on the network device when both of the first and second mirroring configurations are received at establishment of the subscriber session.

13. The non-transitory computer-readable medium of claim 11, further comprising instructions causing the processor to apply the more recently received one of the first and second mirroring configurations to the subscriber session when at least one of the first and second mirroring configurations is received after establishment of the subscriber session.

14. The non-transitory computer-readable medium of claim 11, wherein the instructions to receive the first mirroring configuration comprise instructions to receive a trigger rule from the CLI of the network device that matches the subscriber session.

15. The non-transitory computer-readable medium of claim 11, wherein the instructions to receive the second mirroring configuration comprise instructions to receive an intercept message for the subscriber from the authentication device that includes an identification trigger that matches the subscriber session.

* * * * *